US006963184B2

(12) United States Patent
Carlson

(10) Patent No.: US 6,963,184 B2
(45) Date of Patent: Nov. 8, 2005

(54) ADAPTABLE SPATIAL NOTCH FILTER

(75) Inventor: Daniel H. Carlson, Arden Hills, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 96 days.

(21) Appl. No.: 10/255,435

(22) Filed: Sep. 26, 2002

(65) Prior Publication Data

US 2004/0066162 A1 Apr. 8, 2004

(51) Int. Cl.[7] .................................................. H02P 7/00

(52) U.S. Cl. ....................... 318/460; 318/461; 318/463; 318/128; 318/480

(58) Field of Search ................................ 318/460, 461, 318/799, 128, 480, 463, 807–810; 708/819

(56) References Cited

U.S. PATENT DOCUMENTS

| | | | | |
|---|---|---|---|---|
| 4,088,934 A | * | 5/1978 | D'Atre et al. | 318/802 |
| 4,454,428 A | * | 6/1984 | Kimmel et al. | 290/40 R |
| 4,924,166 A | | 5/1990 | Roussel | 318/608 |
| 4,980,625 A | | 12/1990 | Shimada | |
| 5,331,299 A | | 7/1994 | Smith | |
| 5,404,418 A | * | 4/1995 | Nagano | 388/806 |
| 5,559,689 A | | 9/1996 | Kirchberg et al. | 363/95 |
| 5,666,158 A | * | 9/1997 | Sekine et al. | 348/209.99 |
| 5,833,173 A | | 11/1998 | Tran et al. | |
| 5,889,398 A | | 3/1999 | Reck et al. | 324/76.24 |
| 5,929,700 A | * | 7/1999 | Fuller et al. | 327/556 |
| 5,960,091 A | | 9/1999 | White et al. | |
| 6,144,181 A | | 11/2000 | Rehm et al. | |
| 6,211,640 B1 | * | 4/2001 | Fujisaki et al. | 318/636 |
| 6,212,540 B1 | * | 4/2001 | Murakami et al. | 708/819 |
| 6,219,196 B1 | * | 4/2001 | Semba et al. | 360/75 |
| 6,274,995 B1 | * | 8/2001 | Kerner | 318/611 |
| 6,426,545 B1 | * | 7/2002 | Eichelberger et al. | 257/633 |
| 6,566,837 B1 | * | 5/2003 | Zhang et al. | 318/610 |

FOREIGN PATENT DOCUMENTS

| | | |
|---|---|---|
| EP | 1 191 310 A2 | 3/2002 |
| GB | 2 266 976 A | 11/1993 |
| JP | 58 060315 | 4/1983 |
| JP | 01 170396 A | 7/1989 |
| JP | 2002 188936 | 7/2002 |
| SU | 1084934 | 4/1984 |

* cited by examiner

*Primary Examiner*—Rita Leykin
(74) *Attorney, Agent, or Firm*—Brian E. Szymanski

(57) ABSTRACT

A spatial notch filter is described that adapts in accordance with changes to an angular velocity of a rotating component within a manufacturing system. In a manufacturing system, noise may appear in feedback signals due to spatially distributed physical features in the system, such as imperfections in the components or sensors. This noise may be concentrated in a frequency band that changes as the angular velocity of rotating system components changes. The invention provides techniques for filtering this noise with one or more notch filters, and for adapting the center frequency of the notch filter as a function of angular velocity. The center frequency of the notch filter tracks the noise when the noise frequency changes.

40 Claims, 7 Drawing Sheets

ADAPTABLE SPATIAL NOTCH FILTER

TECHNICAL FIELD

The invention relates to closed-loop control systems, such as systems for controlling manufacturing processes.

BACKGROUND

Continuous feed manufacturing systems, such as manufacturing systems used to produce paper, film, tape, and the like, often include one or more motor-driven rollers. These systems often include electronic controllers that output control signals to engage the motors and drive the motors at pre-determined speeds. A typical controller often monitors the speed of the motor, the roller, or both, with a feedback circuit, and adjusts the control signal to compensate for any detected error an angular velocity.

The feedback signals, in addition to conveying information about the performance of the system components, may also include noise. In general, the noise is useless information, and is unrelated to the true performance of the components of the system.

SUMMARY

In general, the invention relates to controlling a notch filter as a function of an angular velocity of one or more components of a system. For example, a center frequency of a notch filter may be dynamically controlled as an angular velocity of a motor within a manufacturing environment changes. The notch filter may attenuate noise occupying a frequency band in a feedback signal.

In a feedback system, such as a system in a manufacturing environment or a system that precisely controls the velocity of one or more components, sensors monitor the operation of the components of the system. The sensors generate one or more feedback signals that reflect the performance of the components, and a controller controls the operation of the system in response to the feedback signals. In an exemplary system discussed below, a controller controls the angular velocity of a motor, which in turn drives another component such as a roller. Sensors monitor the angular velocities of the motor, roller or both, and generate feedback signals that reflect the angular velocities.

A feedback signal includes data that reflects component performance, such as the angular velocity of a monitored component. A feedback signal may also include false data that do not reflect component performance. Some false data or noise is related to the geometries of components in the system. In other words, some noise disturbances are correlated to physical features of the system and do not indicate actual disturbances in component performance. The physical features of the system that generate the noise disturbances are spatially, rather than temporally, distributed. Although the physical features may move over time, the physical features do not move spatially relative to other components in the system.

Noise may be caused, for example, by physical imperfections that are spatially distributed on a motor shaft monitored by a sensor. As the motor turns, the shaft with the imperfections turns as well. The imperfections may affect a feedback signal generated by the sensor that senses the position or rotational speed of the shaft, and thereby introduce noise into the feedback signal. The sensor detects the physical imperfections of the shaft, and interprets the imperfections as variations in the position or angular velocity of the shaft. As a result, the feedback signal includes noise indicating variations in the position or angular velocity of the shaft, when in fact there may be no variations in the position or angular velocity of the shaft. This noise does not accurately reflect the true position or angular velocity of the shaft.

Other physical features in the system may contribute to noise in the feedback signal as well. Physical features of the sensor, for example, may contribute to periodic noise that indicates variations in position or angular velocity, when no such variations are actually present.

Noise caused by physical features spatially distributed in the system is periodic and manifests itself in a frequency band in the feedback signal. The frequency of the noise is a function of the spatial distribution of the features and the angular velocity of rotating components. As the angular velocity of a motor changes, for example, the angular velocity of the shaft changes as well, and sensors encounter the physical imperfections in the shaft more frequently. Accordingly, the frequency of the noise caused by the imperfections changes as well. In particular, the center frequency of the noise frequency band changes with the angular velocity of the rotating components. In addition, the center frequency of the noise frequency band may change linearly as the angular velocity changes.

A controller governs the angular velocity of one or more these components. The noise may interfere with the operation of the controller. In particular, the noise may cause the controller to correct for conditions, such as variations in angular velocity, that are not actually taking place. Accordingly, the invention provides a notch filter that attenuates the noise created by spatially distributed physical features.

The notch filter, which may be a digital filter implemented by a digital processor, includes an adaptable center frequency. As the angular velocity of a rotating component of the system changes, the frequency of the noise created by spatially distributed physical features changes linearly with the angular velocity. Accordingly, the center frequency of the notch filter changes linearly with the angular velocity as well. In this way, the center frequency of the notch filter tracks the noise when the noise frequency changes, and continues to reject the noise.

In some circumstances, a signal may include noise in two or more frequency bands. Two or more notch filters may be controlled with different center frequencies to reject the different noise frequencies. Each of the notch filter center frequencies is adaptable to changes in angular velocity.

In one embodiment, the invention is directed to a method comprising receiving a speed signal representing an angular velocity, and attenuating a frequency band of a feedback signal as a function of the angular velocity. The angular velocity may be, for example, a target angular velocity included in a reference signal. The speed signal may represent the angular velocity by representing angular velocity itself or a quantity that is a function of angular velocity, such as rotational position or angular acceleration.

In another embodiment, the invention is directed to a system that includes a motor operable to drive a rotating component in response to a motor control signal and a sensor to generate a feedback signal representing a measurement of the rotating component. The system further includes a filter that receives the feedback signal and attenuates a frequency band of the feedback signal as a function of an angular velocity. The angular velocity may be a target angular velocity. The system may also include a controller to generate the motor control signal as a function of the filtered feedback signal.

In a further embodiment, the invention presents a method, comprising rotating a component at an angular velocity, changing the angular velocity and identifying in a feedback signal responsive to the rotation at least one frequency of a periodic signal that changes linearly with the change in angular velocity. The identified periodic signal may encode useful information or useless noise, and the method may also include techniques for distinguishing useful information from noise. A notch filter may be selected to suppress the periodic signal, and the method may also include changing the center frequency of the notch filter linearly with the change in angular velocity.

In another embodiment, the invention is directed to a method comprising identifying in a signal at least one frequency band of noise generated by one or more spatially distributed physical features on at least one rotating component having an angular velocity, and computing a center frequency for a notch filter as a function of the angular velocity.

In an additional embodiment, the invention presents an apparatus comprising a pre-processing unit that receives and samples a feedback signal and a processor that receives a reference signal indicating a target angular velocity and filters the sampled feedback signal with a notch filter. A center frequency of the notch filter is a function of the target angular velocity. The apparatus may also include a current driver driven by the processor as a function of the target angular velocity and the filtered feedback signal.

In a further embodiment, the invention is directed to a method for setting a sampling frequency. The method includes identifying a fundamental frequency as a function of an angular velocity, identifying a harmonic of the fundamental frequency and setting a sampling frequency for sampling a feedback signal as a function of the fundamental frequency and the harmonic. This technique may be used to tune a notch filter.

In an added embodiment, the invention is directed to a device comprising a sensor to generate a signal representing a measurement of a rotating component and a filter that attenuates a frequency band of the signal as a function of an angular velocity. The device may be implemented as a self-contained sensor, for example, that generates a signal as a function of a measurement of a rotating component and filters the signal as a function of the angular velocity of the rotating component.

The invention may present a number of advantages. The adaptive notch filter is well-suited for rejecting noise due to physical features in the system, and is especially helpful in rejecting some kinds of noise that are due to spatial disturbances and that do not reflect the actual performance of system components. As the center frequency of the noise changes with angular velocity, the frequency band rejected by a notch filter changes with the angular velocity as well. The notch continues to track and suppress the noise. In addition, the noise is rejected without regard to the phase of the noise.

With the adaptive notch filter, the controller can be made very responsive to the feedback signals. Because noise created by spatially distributed physical features is attenuated by the notch filter, the controller will not respond to the noise. Accordingly, the controller can respond quickly to signals that reflect actual component performance, with less risk of responding to signals that do not reflect actual component performance. The adaptive notch may also be faster and more efficient than many other techniques for noise rejection.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
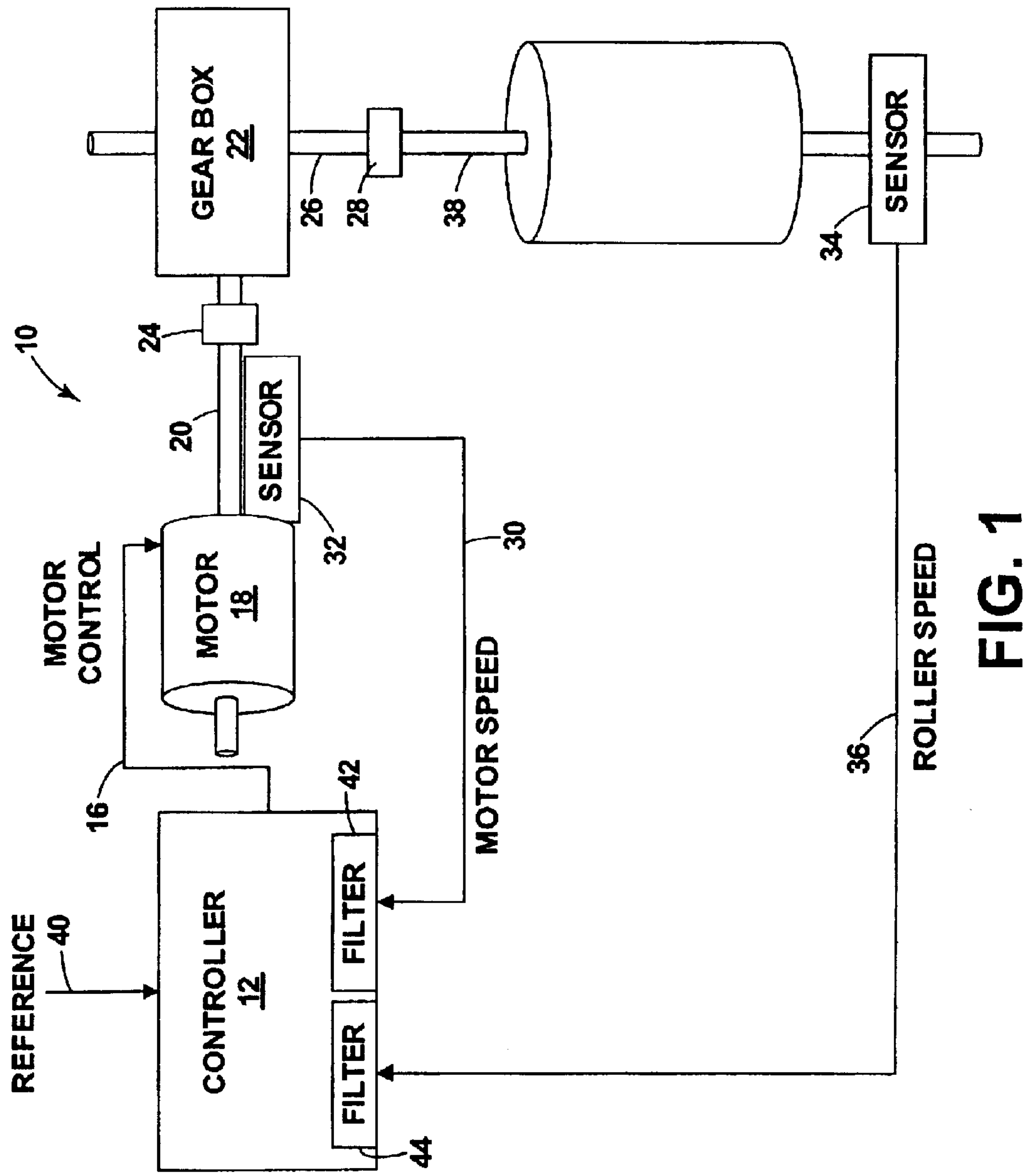
FIG. 1 is a block diagram illustrating an example system in which a controller drives a roller.

FIG. 1 is a block diagram illustrating an example system 10 in which a controller 12 controls the angular velocity of a rotating component, such as a roller 14. System 10 may be used in a variety of applications, including a continuous feed manufacturing environment to produce paper, film, tape, and the like. Roller 14 may be, for example, a precision web-handling roller within a manufacturing environment.

Controller 12 outputs motor control signals 16 to motor 18, which drive roller 14. Motor control signals 16 may be one or more current signals generated by a current driver (not shown in FIG. 1) under the control of controller 12. Motor 18 drives shaft 20 in response to motor control signals 16. Shaft 20 is mechanically coupled to gear box 22 via coupler 24. Gear box 22 in turn drives shaft 26, which is mechanically coupled to roller 14 via coupler 28. Gear box 22 may comprise a number of gears to provide a suitable gear ratio to drive roller 14. Gear box 22 is an exemplary subsystem for transmission of power and is not limited to gears, but may include components such as belt drives.

Controller 12 receives motor speed signal 30 indicative of the angular velocity of shaft 20. Motor speed signal 30 may be supplied by a sensor 32 that generates a signal as a function of the angular velocity of shaft 20 coupled to motor 18. In addition, controller 12 receives from sensor 34 a roller speed signal 36 that is a function of the angular velocity of shaft 38 coupled to roller 14. Sensors 32 and 34 may comprise, for example, sine encoders mounted to shaft 20 of motor 18 and to shaft 38 of roller 14, respectively. Sensors 32 and 34 may supply position-encoded motor and roller speed signals 30, 36 to controller 12.

The invention is not limited to sine encoder sensors, nor is the invention limited to systems that include sensors that sense rotational position. The invention may be implemented with sensors that measure any quantity or quantities that can represent an angular velocity. For example, angular velocity may be derived from rotational position by differentiating, and may be derived from angular acceleration by integrating. The invention also encompasses sensors that sense other quantities that may represent an angular velocity, such as a pressure sensor that measures a pressure differential.

Feedback signals 30, 36 may include periodic signals caused by physical features of system 10. Physical features causing the periodic signals may include physical imperfections that are spatially, rather than temporally, distributed in system 10. The periodic signals may be caused, for example, by physical imperfections of system components such as motor 18 or shaft 20.

Some of the periodic signals may be useful. For example, physical imperfection in motor 18 may cause some variations in the angular velocity of motor 18. The variations may be detected by sensor 32 and may be fed back on motor speed signal 30.

Other periodic signals caused by physical imperfections of system components, however, may be useless noise. Imperfections spatially distributed on shaft 20, for example, may affect the ability of sensor 32 to generate motor speed signal 30 accurately reflecting the angular velocity of shaft 20. Sensor 32 may interpret the imperfections in shaft 20 as variations in the rotational speed of shaft 20, rather than as variations in the physical structure of shaft 20. As a result, motor speed signal 30 may include a useless periodic signal that indicates that the angular velocity of shaft 20 is time-varying, when in fact the angular velocity of shaft 20 is constant. This useless periodic signal may detrimentally affect the operation of system 10, because controller 12 may compensate for changes in angular velocity based upon motor speed signal 30, and may therefore compensate for changes in angular velocity that are not actually occurring.

Noise caused by spatially distributed physical features in the system is periodic, as opposed to aperiodic noise such as white noise. As a result, the noise of concern tends to concentrate power in a narrow frequency band in the feedback signal. Noise in a narrow frequency band is often a characteristic of sensors such as optical encoders, magnetic sensors and tachometers that generate signals indicating the position of shafts.

The frequency of the noise is a function of the spatial distribution of the features and the angular velocity of rotating components. As the angular velocity of shaft 20 changes, for example, sensor 32 encounters the physical imperfections in shaft 20 more frequently, and the frequency of the noise caused by the imperfections changes as well. The center frequency of the noise frequency band may change linearly as the angular velocity changes.

Controller 12 controls the angular velocity of motor 18, and thereby controls the angular velocity of other rotating components driven by motor 18, such as roller 14 or shaft 20. Controller 12 receives a reference signal 40 that provides a target reference for driving motor 18 or roller 14. A process control unit or other device (not shown), for example, may provide reference signal 40 according to a manufacturing model. Reference signal 40 may comprise a motor speed reference signal, a roller speed reference signal, a motor torque reference signal, and a motor position reference signal, or the like. Based on roller speed signal 36, reference signal 40, motor speed signal 30, or combinations thereof, controller 12 controls motor 18 to regulate the angular velocities of motor 18 as well as the components driven by motor 18.

In a typical manufacturing environment, it is often desirable to maintain the angular velocity of roller 14 at a constant value. Unfortunately, as described above, physical characteristics of system 10 introduce periodic signals into feedback signals 30, 36. Some of the periodic signals may be meaningful signals that truly indicate component performance, and some of the periodic signals may be useless noise. The noise may interfere with maintaining a constant angular velocity of roller 14. Sensor 34 monitoring the rotation of shaft 36, for example, may sense one or more imperfections on shaft 36, and may adjust roller speed signal 36 as a result. Even when shaft 38 is rotating at a constant angular velocity, imperfections in shaft 38 sensed by sensor 34 may cause roller speed signal 36 to indicate an angular velocity that is time-varying.

The frequency of the noise may be within the bandwidth of meaningful signals used in system 10, and may be mistaken for a meaningful signal. The noise may affect the operation of controller 12, which generates motor control signals 16 as a function of one or more feedback signals. As a result, controller 12 may adjust motor control signals 16 to correct a problem that does not exist.

It is undesirable for controller 12 to generate motor control signals 16 as a function of the noise. Noise generated by imperfections in sensors 32 and 34, for example, does not reflect actual performance of components, such as the true angular velocity of shafts 20 and 38. Because the noise is not indicative of actual performance, it is inefficient for controller 12 to generate motor control signals 16 to compensate for the noise. Compensating for the noise may also impair the operation of system 10, because controller 12 may drive motor 18 slower or faster to compensate for nonexistent speed variations. Compensating for nonexistent speed variations may introduce undesirable speed variations where none existed before.

Noise may be caused by a number of different sources. Consequently, several noise frequency bands may be present in system 10. The noise frequency bands for feedback signals generated by sensors 32 and 34, for example, may be distinct.

Passing feedback signals from sensors 32, 34 through notch filters 42, 44 removes a substantial portion of the noise. Notch filters 42, 44 are configured, as described below, as band stop filters that reject the frequency band carrying the noise. Accordingly, motor speed signal 30 passes through notch filter 42, and roller speed signal passes through notch filter 44, and notch filters 42, 44 reject noise in particular frequency bands.

Notch filters 42 and 44 may be implemented as digital filters, as will be described in detail below. Although as shown as included in controller 12, notch filters 42 and 44 may be implemented by one or more digital processors separate from controller 12. Controller 12 uses filtered feedback signals to regulate motor control signals 16, which in turn drive motor 18. Filtered feedback signals are more truly reflective of the actual performance of the components in system 10.

A notch filter defines a range of frequencies to be rejected, with the range centered around a center frequency. The invention includes techniques for adapting one or more notch filters as a function of an angular velocity. In particular, the center frequency attenuated by notch filter 42 may be adapted as a function of an angular velocity represented by reference signal 40, or as a function of the actual measured angular velocity of motor 18 or shaft 20. Similarly, the center frequency of notch filter 44 may be adapted as a function of reference signal 40 or the actual measured angular velocity of roller 14 or shaft 38. The center frequency of notch filter 44 may be adapted as a function of the angular velocity of another rotating component as well.

When notch filters 42, 44 suppress the periodic noise, controller 12 can be made very responsive to feedback signals 30, 36. Because filters 42, 44 have removed the noise, controller 12 can respond quickly to signals reflecting actual component performance, with less risk of responding to signals that do not reflect actual component performance. For example, controller 12 can respond quickly to meaningful signals that truly indicate variations in angular velocity, and ignore noise that falsely indicates variations in angular velocity.

The Laplace transform for filters 42 and 44 can be represented as:

$$TF = \frac{Y(s)}{X(s)} = \frac{s^2 + \omega_n^2}{s^2 + 2\zeta\omega_n s + \omega_n^2} \tag{1}$$

in which s is the Laplace complex frequency variable, $\omega_n$ is the notch filter center frequency (i.e., the frequency to be attenuated) in radians per second, and $\zeta$ is the damping ratio. Damping ratio $\zeta$ determines the width of the notch. In general, a large $\zeta$ results in a wide-width/shallow-depth notch, and a small $\zeta$ results in a narrow frequency band with high attenuation in that band.

Furthermore, the center frequency of the band to be attenuated, $\omega_n$, can be expressed as:

$$\omega_n = \frac{2\pi \cdot RPM \cdot n}{60} \tag{2}$$

in which the number of cycles per unit of time is given in revolutions per minute (RPM). RPM is typically a known or target quantity, representing the base angular velocity of a rotating component that should be exhibited when system 10 reaches steady state. RPM may be specified, for example, in reference signal 40. RPM may also be a measured angular velocity. The factor of $2\pi/60$ converts the units of $\omega_n$ to radians per second.

The variable n represents a scaling factor that linearly relates the center frequency of the noise to the angular velocity. Scaling factor n may be any positive value. In some circumstances, n may be the number of disturbances sensed by a sensor during one rotation of a rotating component. If there is a single disturbance per rotation, for example, then n=1. On a 1,024-line sine encoder, there may be disturbances 1,024 times per rotation due to non-uniformities in the encoder manufacturing process, and in that case, n=1,024. Scaling factor n is an integer with respect to the rotating component that generates the noise, but need not be an integer with respect to other rotating components in the system.

Equation (2) relates the frequency to be attenuated to a known or target angular velocity. If the known or target angular velocity is expressed in units such as cycles per second or radians per minute, different conversion factors may be used to assure that the units of $\omega_n$ will be radians per second.

To implement notch filters 42 and 44 in a digital domain, the transfer function may be converted from the s-domain to the z-domain. This may be accomplished by using a bilinear transform that maps s to a digital delay operator z as follows:

$$s = \left(\frac{2}{T}\right)\frac{z-1}{z+1} \tag{3}$$

with T representing the sampling time. With this mapping, the equation $$s^2 = \left(\left(\frac{2}{T}\right)\frac{z-1}{z+1}\right)^2 = \frac{4}{T^2} \cdot \frac{z^2 - 2z + 1}{z^2 + 2z + 1} \tag{4}$$

may be used to express $s^2$.

Some distortion to the frequency mapping in equations (3) and (4) may result from aliasing and slow sampling. To improve the accuracy of the mapping, the following operation may be performed:

$$\omega_A = \frac{2}{T}\tan\left(\frac{\omega_D \cdot T}{2}\right) \tag{5}$$

in which $\omega_A$ is the notch filter center frequency in the analog domain and $\omega_D$ is the notch filter center frequency in the digital domain. When the sampling rate is sufficiently high relative to the notch filter center frequency, however, the operation shown in equation (5) may be unnecessary, as little distortion occurs between the analog and digital domains.

Assuming the sampling rate is sufficiently high, the transfer function may now be expressed as:

$$TF = \frac{\left(\frac{4}{T^2} \cdot \frac{z^2 - 2z + 1}{z^2 + 2z + 1}\right) + \left(\frac{\pi^2 \cdot RPM^2 \cdot n^2}{900}\right)}{\left(\frac{4}{T^2} \cdot \frac{z^2 - 2z + 1}{z^2 + 2z + 1}\right) + 2\zeta\left(\frac{\pi \cdot RPM \cdot n}{30}\right)\left(\frac{2}{T}\right)\left(\frac{z-1}{z+1}\right) + \left(\frac{\pi^2 \cdot RPM^2 \cdot n^2}{900}\right)} \tag{6}$$

To implement the transfer function shown in equation (6), the terms may be arranged as:

$$Y\left(\left(\frac{4}{T^2} + \frac{4\zeta\omega_n}{T} + \omega_n^2\right) + \left(\frac{-8}{T^2} + 2\omega_n^2\right)z^{-1} + \left(\frac{4}{T^2} + \frac{-4\zeta\omega_n}{T} + \varpi_n^2\right)z^{-2}\right) = X\left(\left(\frac{4}{T^2} + \omega_n^2\right) + \left(2\omega_n^2 - \frac{8}{T^2}\right)z^{-1} + \left(\frac{4}{T^2} + \omega_n^2\right)z^{-2}\right) \tag{7}$$

in which the notch filter center frequency is compactly represented as $\omega_n$. By rearranging terms and converting to the time domain, the following finite difference equation is obtained:

$$y(n) = \frac{\left[\begin{array}{l}\left(\frac{8}{T^2} - 2\omega_n^2\right)y(n-1) + \left(\frac{-4}{T^2} + \frac{4\zeta\omega_n}{T} - \varpi_n^2\right)y(n-2) + \\ \left(\frac{4}{T^2} + \omega_n^2\right)x(n) + \left(2\omega_n^2 - \frac{8}{T^2}\right)x(n-1) + \left(\frac{4}{T^2} + \omega_n^2\right)x(n-2)\end{array}\right]}{\left(\frac{4}{T^2} + \frac{4\zeta\omega_n}{T} + \omega_n^2\right)} \tag{8}$$

which may be implemented on a digital processor such as a computer. Controller 12 may be one embodiment of such a digital processor. In equation (8), the notch filter center frequency is compactly represented as $\omega_n$, but may be expressed in terms of a known or target angular velocity by substituting the expression found in equation (2).

As shown in equation (2), the noise center frequency is linearly related to the angular velocity of a rotating component. Accordingly, a change in the angular velocity of the rotating component causes a linear change in the noise center frequency. In other words, as the angular velocity scales up or down, the frequencies of the noise shift up or down the frequency spectrum. The noise frequency can be mapped to a notch filter center frequency using equation (2). In particular, n can be found by investigation, as will be described below. In addition, the value of RPM, i.e., the base angular velocity in revolutions per unit of time, is a known or target quantity. Accordingly, by equation (2), it is possible to predict the frequency bands of the noise when the system reaches a steady state.

Moreover, according to equation (2), scaling the base angular velocity RPM up or down by a known degree will scale the notch frequency $\omega_n$ up or down by the same degree. When $\omega_n$ is known, a digital notch filter can be implemented as shown in equation (8). In this way, the notch filter adapts to changes in angular velocity and rejects noise frequencies as a function of angular velocity.

Figure 2:
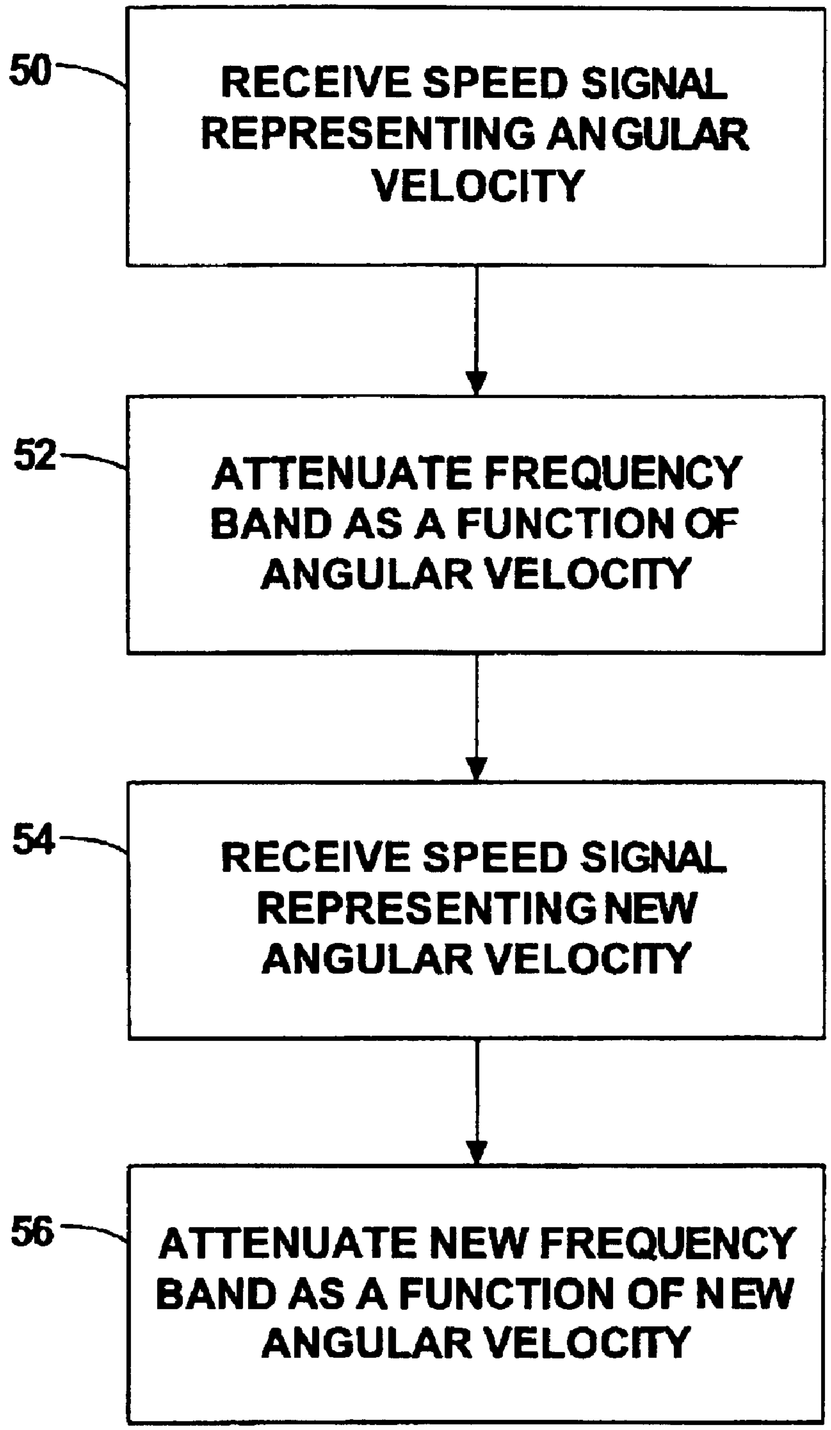
FIG. 2 is a flowchart providing an overview of the operation of an adaptable notch filter.

FIG. 2 is a flow diagram illustrating the operation of a digital processor, such as controller 12, that implements an adaptive notch filter. The digital processor receives a signal representing an angular velocity of a rotating component, such as motor 18 or roller 14 (50). The signal may be reference signal 40 representing a base or target angular velocity, for example, or a feedback signal representing a measured angular velocity. The signal may represent an angular velocity by representing any quantity that is a function of angular velocity, such as rotational position. In such a case, the digital processor may derive an angular velocity by, for example, taking the derivative of rotational position.

The processor attenuates or rejects a frequency band as a function of the angular velocity (52). The processor may implement a digital notch filter as described above, controlling the center frequency as a function of the angular velocity. The notch filter center frequency is also a function of scaling factor n and damping ratio $\zeta$, which may be determined by investigation and selected by a system designer.

When the processor receives a signal indicating a change in angular velocity (54), the processor attenuates or suppresses a new frequency band as a function of the new angular velocity (56). The change in angular velocity may be caused by a change in reference signal 40, for example, or may be a measured change in angular velocity of a system component.

More specifically, the center frequency of noise generated by spatial disturbances often changes linearly with angular velocity. The processor controls the center frequency of the notch filter to follow the change in the center frequency of the noise, thereby adaptively controlling the notch filter to suppress the noise. In particular, the processor may compute a new value of $\omega_n$ according to equation (2) (the n and $\zeta$ factors may remain unchanged), and may substitute the new value for $\omega_n$ into equation (8). In this way, the digital processor rejects noise in a frequency band as a function of the angular velocity, and continues to reject the noise even when the frequency band changes. In this manner, the processor may continuously sample one or more speed signals representing angular velocities of one or more rotating components, and adaptively control one or more notch filters based on the signals.

Figure 3:
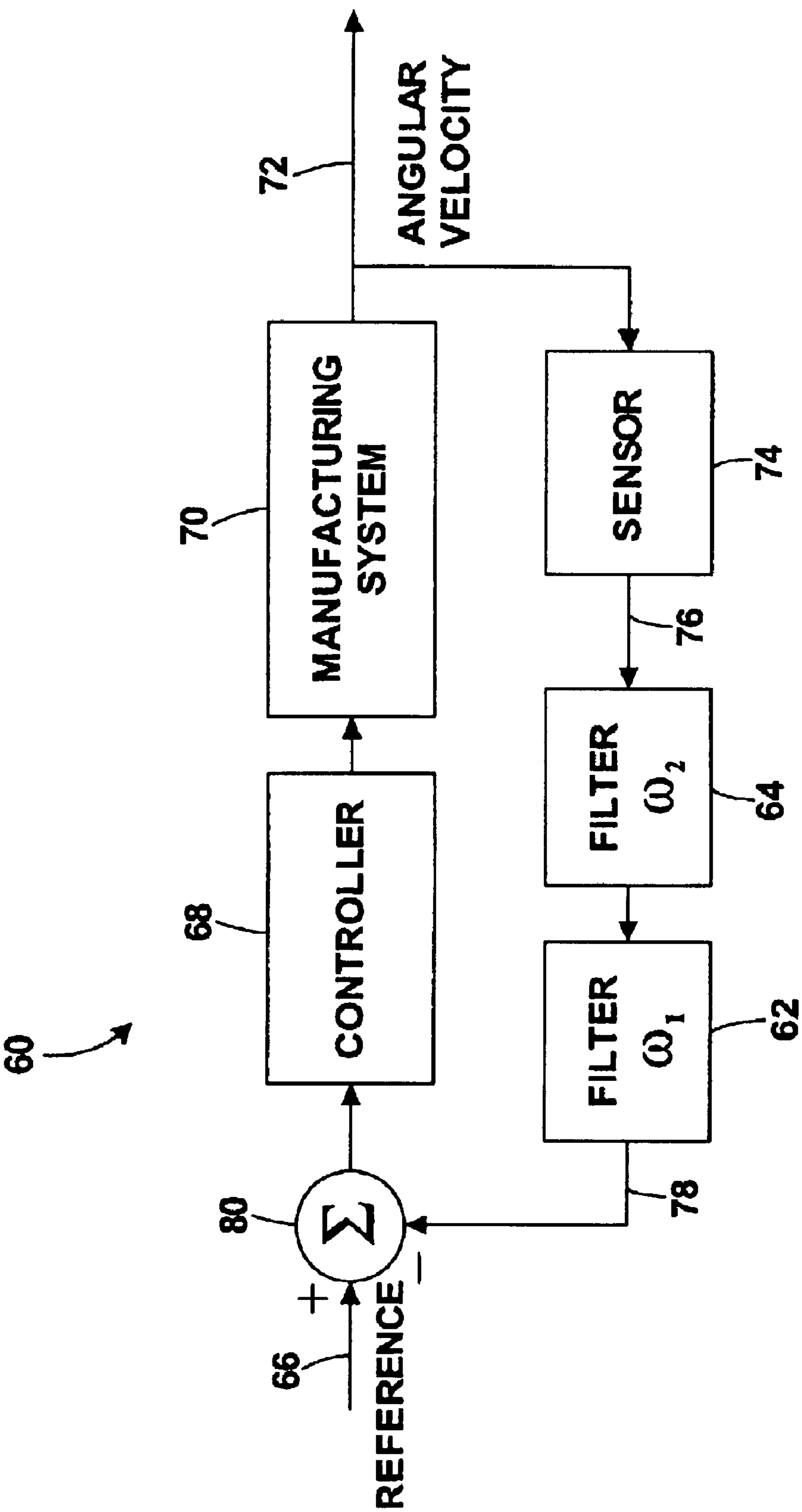
FIG. 3 is a block diagram illustrating a feedback system with notch filters in series.

FIG. 3 is a block diagram showing a model 60 of a feedback system with notch filters 62 and 64. Feedback system model 60 receives a reference signal 66. Reference signal 66 is supplied to a controller 68, and controller 68 drives manufacturing system 70 as a function of reference signal 66. The output 72 of manufacturing system 70 is a function of angular velocity, such as rotational position, angular velocity or angular acceleration. Sensor 74 senses output 72. Sensor 74 generates a feedback signal 76 that is filtered by notch filters 62 and 64 and is supplied to controller 68. In feedback system model 60, filtered feedback signal 78 is subtracted 80 from reference signal 66.

Feedback system model 60 may serve as a model for many systems that employ velocity control, such as example system 10 shown in FIG. 1. Feedback system model 60 need not correlate element-by-element to system 10. For example, manufacturing system 70 may correspond to motor 18, shaft 20, roller 14, shaft 38, or any combination thereof, or other components of system 10. Controller 12 in example system 10 may perform the functions of controller 68 and subtraction element 80 in feedback system model 60.

In feedback system model 60, two frequency bands carrying noise have been identified. The noise in these frequency bands may not be indicative of the actual performance of the sensed components and, if not filtered, may detrimentally affect the operation of controller 68. The noise in these frequency bands may arise from different sources. The sources may cause different numbers of disturbances per cycle. In other words, a first noise source may result from features that cause $n_1$ disturbances per cycle, and a second noise source may result from features that cause $n_2$ disturbances per cycle. By equation (2), therefore, the first noise source generates noise at center frequency $\omega_1$ and the second noise source generates noise at center frequency $\omega_2$.

Figure 4:
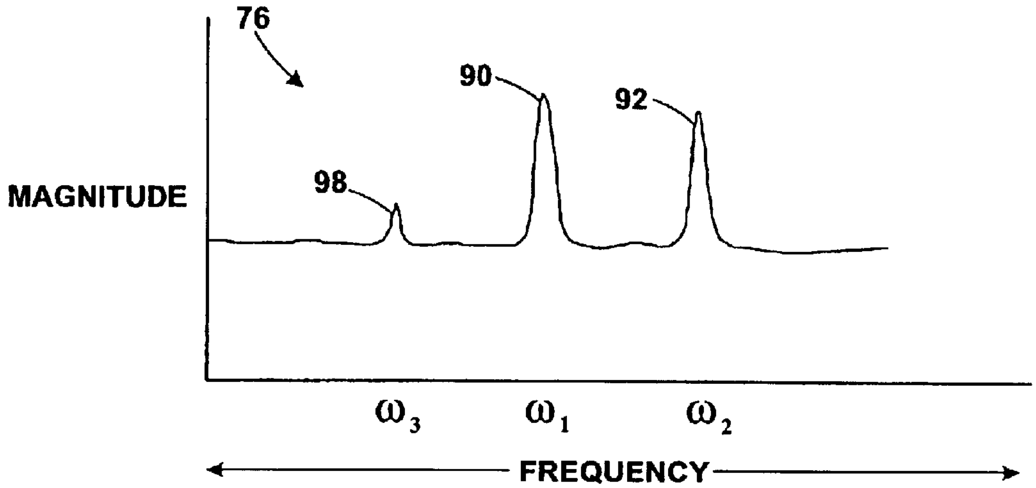
FIG. 4 is a graph illustrating an example feedback signal within the frequency domain, including noise in two frequency bands.

FIG. 4 is a graph illustrating an exemplary unfiltered feedback signal 76 from FIG. 3 in the frequency domain. Unfiltered feedback signal 76 includes a broadband signal with a first noise signal 90 near frequency $\omega_1$ and a second noise signal 92 near frequency $\omega_2$ . Controller 68 ordinarily uses the broadband signal to control manufacturing system 70. Noise signals 90 and 92 may affect the operation of controller 68, however, and may cause controller 68 to compensate for errors in component performance that do not actually exist.

Figure 5:
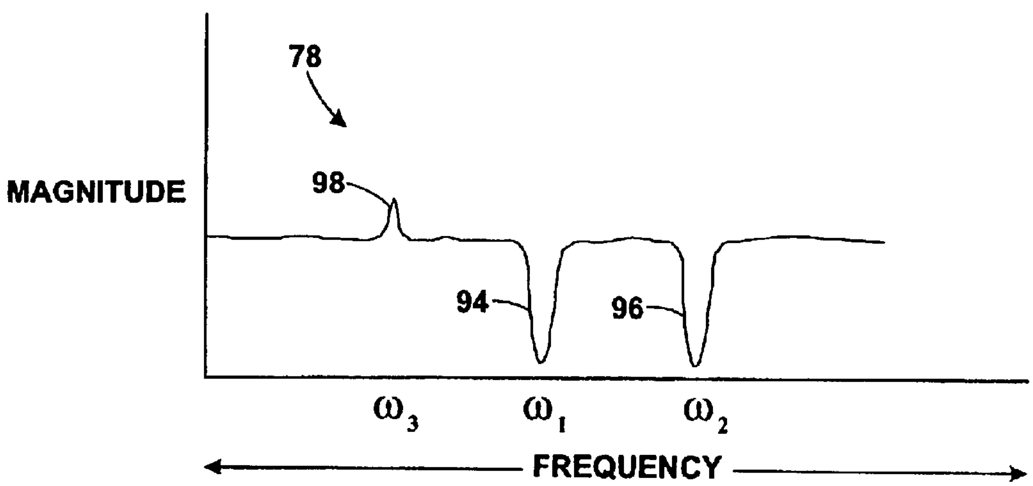
FIG. 5 is a graph illustrating the example feedback signal of FIG. 4 following filtering by notch filters.

FIG. 5 is a graph illustrating filtered feedback signal 78 from FIG. 3 in the frequency domain. Notch filters 62 and 64 have removed noise having center frequencies of $\omega_1$ and $\omega_2$, respectively, and have allowed signals in other frequency bands to pass. Consequently, filtered feedback signal 78 includes a first attenuated frequency band 94 near frequency $\omega_1$, and a second attenuated frequency band 96 near frequency $\omega_2$. Noise signals 90 and 92 have been filtered from the broadband signal.

Unfiltered feedback signal 76 in FIG. 4 and filtered feedback signal 78 in FIG. 5 include a third signal 100 in a narrow frequency band near frequency $\omega_3$. Third signal 100 represents a meaningful signal that reflects the true performance of a system component. Like noise signals 92 and 94, third signal 100 may occupy a narrow frequency band. In some cases, the center frequency of third signal 100 may vary linearly with the angular velocity of a rotating component, like noise signals 92 and 94. Third signal 100 may represent, for example, an imperfection in a motor that causes an actual variation in the angular velocity of the motor one or more times per rotation. As shown in FIG. 5, notch filters 62 and 64 have not attenuated the broadband signal near $\omega_2$.

Notch filters 62 and 64 may be realized using techniques described above. In particular, the center frequencies to be rejected may be determined by application of equation (2), and a digital notch filter for each center frequency may be implemented as shown in equation (8). Each notch filter adapts to changes in angular velocity and rejects noise frequencies as a function of angular velocity. As center frequencies $\omega_1$ and $\omega_2$ change with angular velocity, the center frequencies of notch filters 62 and 64 change with angular velocity as well, following and suppressing noise signals 90, 92.

The series configuration of notch filters 62 and 64 shown in FIG. 3 is exemplary. Any number of filters may be used, and the filters need not be arranged as shown. In the case of independent feedback signals such as is depicted in FIG. 1, for example, one or more notch filters may filter each feedback signal. Moreover, notch filters may be implemented with different parameters, such as different $\zeta$ values.

Figure 6:
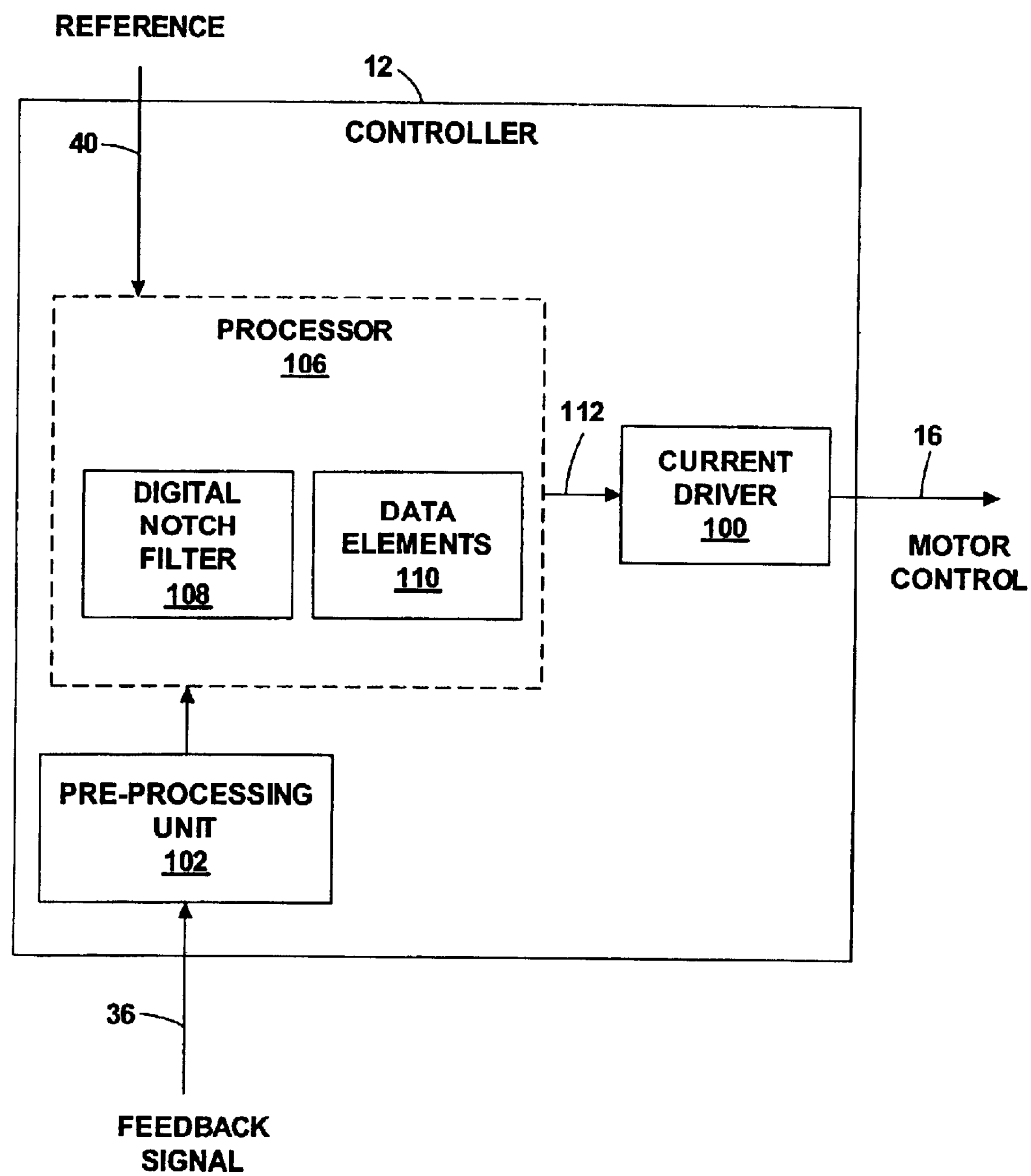
FIG. 6 is a block diagram illustrating an example embodiment of the controller in further detail.

FIG. 6 is a block diagram illustrating an example embodiment of a controller such as controller 12 in FIG. 1. Controller 12 includes a current driver 100 to output motor control signals 16 based on reference signal 40 and a feedback signal such as roller speed signal 36 from sensor 34. In the following discussion, it is assumed that roller speed signal 36 encodes the rotational position of roller 14.

A pre-processing unit 102 conditions and amplifies roller speed signal 36 and converts the feedback signal from analog signals to digital values. In other words, pre-processing unit 102 samples roller speed signal 36 for digital processing. Pre-processing unit 102 may also apply an analog filter prior to sampling. An analog filter such as a band-pass filter may, for example, reject noise outside the bandwidth of meaningful signals, and may help avoid aliasing during sampling. For purposes of the discussion that follows, it is assumed that the analog filter will not stop noise in some frequency bands within the bandwidth of meaningful signals.

Following conversion of the feedback signal to a digital signal, the digital signal is passed to a digital processor 106 for processing. Processor 106 may comprise an embedded microprocessor, conventional microprocessor, a digital signal processor (DSP), dedicated computational hardware, and the like.

Digital processing includes digitally filtering the feedback signal with a digital notch filter 108 using techniques described above. Processor 106 also generates a high-resolution pulse count, such as 3,600,000 pulses per revolution, based on the line pulses of roller speed signal 36. Based on the pulse count, processor 106 calculates a current angular velocity of roller 14, and generates a set of data elements 110 that relates velocity error of roller 14 to the angular position of roller 14. Processor 106 may, for example, subtract the angular velocity from reference signal 40 to determine an angular velocity error. The noise bands eliminated by digital filtering 108 do not affect the creation of data elements 110.

Processor 106 may store the set of data elements 110 within a storage medium, such as a non-volatile random access memory (NVRAM), FLASH memory or the like. The storage medium may be internal or external to the processor. Processor 106 may also include other memory, such as volatile random access memory, for purposes such as implementing the filtering process of equation (8).

Processor 106 generates a signal 112 based on data elements 110 to represent velocity error as a function of the angular position of roller 14. Signal 112 drives current driver 100.

When the angular velocity of roller 14 changes, such as in response to a change in reference signal 40, processor 106 reconfigures digital notch filter 108 to reject a new center frequency as a function of the new angular velocity, as described above. In this way, digital notch filter 108 rejects noise even if the center frequency of the noise changes with angular velocity.

Although not depicted in FIG. 6, controller 12 may also receive and digitally filter other feedback signals, such as motor speed signal 30 from sensor 32, and may drive current driver 100 as a function of other feedback signals. The configuration of controller 12 may vary in other ways as well. Controller 12 may include, for example, control circuitry that further refines driver signal 112.

The embodiment depicted in FIG. 6 is exemplary. The functions of shown in FIG. 6 need not be performed by controller 12. In an alternate embodiment, signal processing and filtering may be performed by a processor in a sensor. In other words, a sensor may generate a signal as a function of a measurement of a rotating component and may also filter the signal as a function of the angular velocity of the rotating component. The sensor may include a digital processor that selects one or more notch filters to suppress noisy frequency bands and prevent those bands from being passed to the controller. The sensor may use measured angular velocities of the rotating component to select and adjust the notch filters.

Figure 7:
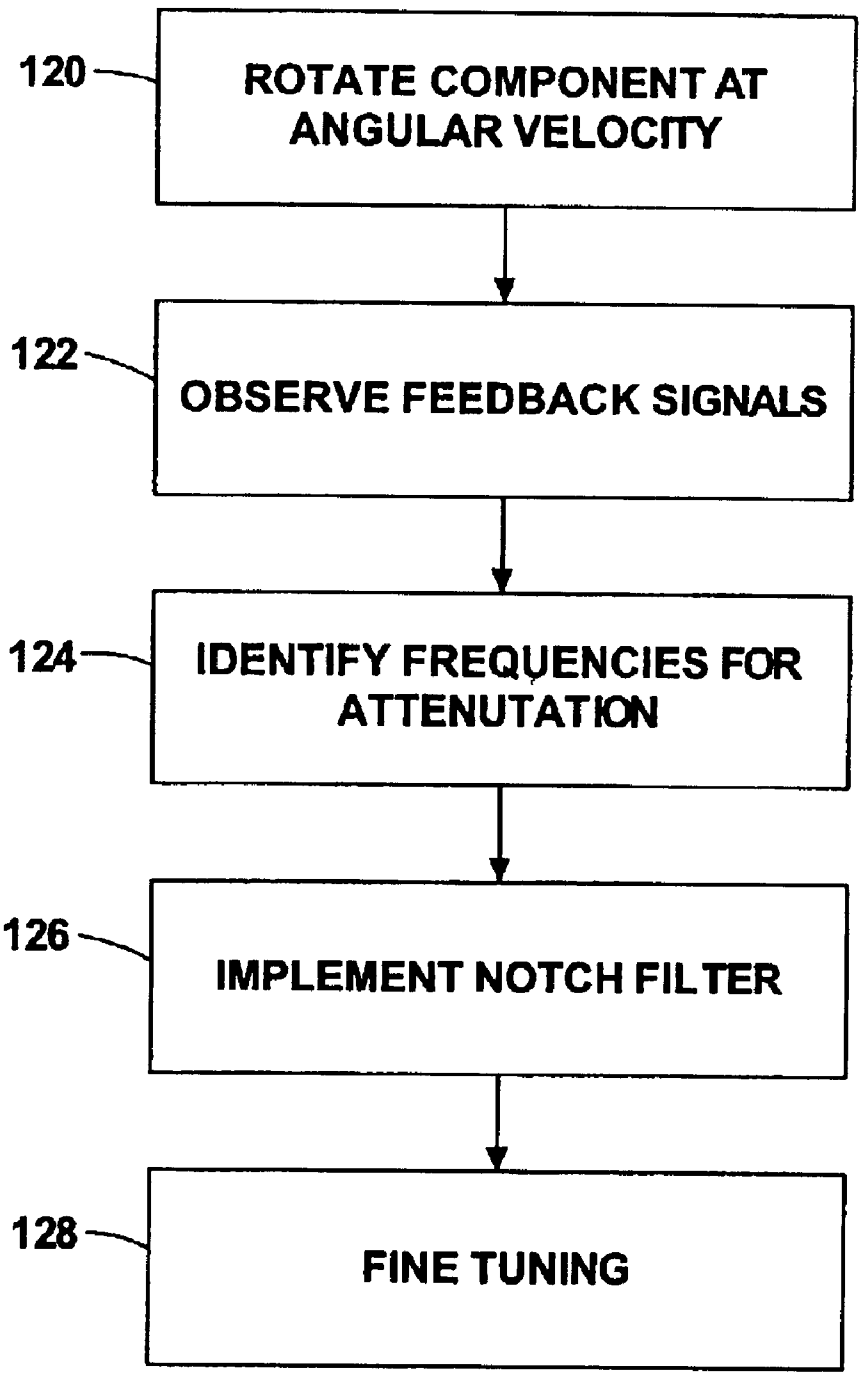
FIG. 7 is a flow diagram illustrating techniques for identifying noise sources.

FIG. 7 is a flow diagram illustrating example techniques for identifying noise sources and selecting an adaptable spatial digital notch filter. In general, the spatially distributed physical features that contribute to signals in frequency bands may manifest themselves after the system is constructed. These sources of periodic signals may be varied and difficult to identify with precision. A signal may be identified as originating from spatially distributed physical features if the frequency of the signal changes linearly with a change in angular velocity.

One technique for identifying spatially distributed physical features that contribute to periodic signals includes rotating a system component, such as a motor, roller or shaft, at an angular velocity (120) and observing the feedback signals (122). The feedback signals may include frequency bands with useful data, similar to third signal 98 in FIGS. 4 and 5, and may also include frequency bands with useless noise.

In some cases, the frequency bands with useful data can be readily identified. In other cases, the frequency bands with useful data can be distinguished from the noisy frequency bands by adjusting the gain of a controller such as controller 68 in FIG. 3. A meaningful signal and a noise signal respond differently to changes in gain. Typically, an increase in controller gain makes controller very responsive to signals reflecting actual component performance, so signals reflecting actual component performance may be decreased by an increase in gain. An increase in gain may have an opposite effect upon noise signals, however, and the noise signals may increase in magnitude as the controller tries to correct a problem that does not exist. In this way, the frequencies of noise caused by spatially distributed physical features may be identified (124) by an operator of the system. Noise may also be identified automatically, such as by performing Fast Fourier Transforms (FFT) on the feedback signals and by observing how the frequency components change in response to changes in angular velocity and gain.

When the noise due to spatially distributed physical features is identified, scaling factor n may be computed for each frequency band containing noise caused by spatially distributed physical features. Once n is known, a filter such as the digital notch filter described in equation (8) may be implemented by specification of n (126). The notch filter may be finely tuned (128) by operating the system at different angular velocities and observing whether and to what extent noise is suppressed.

The notch filter may further be fine tuned when the amplitude and phase of the noise in the feedback signal is known. Unfortunately, amplitude and phase data may be distorted by the sampling process. The invention provides techniques for sampling the feedback signal to obtain amplitude and phase data without distortion.

A feedback signal x(n) may be sampled in a sampling window, with N samples taken at a sampling rate of $f_s$ samples per second. The sequence of n samples may be represented in a discrete Fourier Transform (DFT) as $$x(n)=\sum_{k=0}^{N-1} DFT(k)\cdot e^{\frac{j2\pi nk}{N}} \tag{9}$$

where 2π/N is a fundamental frequency, k is an integer representing the harmonic or frequency component and DFT(k) is coefficient of the sequence at the kth harmonic. DFT(k) for any value of k is found by the equation $$DFT(k)=\sum_{n=0}^{N-1} x(n)\cdot e^{\frac{-j2\pi nk}{N}} \tag{10}$$

which yields a complex value having a magnitude and a phase.

When pre-processing unit 102 samples the feedback signal for processing, pre-processing unit 102 samples the noise. If the frequency of the noise is not an integer multiple of the fundamental frequency 2π/N, then the DFT(k) coefficient for the harmonic closest to the frequency of the noise will not represent the true amplitude and phase of the noise. Rather, two DFT(k) coefficients closest to the frequency of the noise will include an amplitude and phase, and these DFT(k) coefficients will present a distorted representation of the amplitude and phase of the noise.

Figure 8:
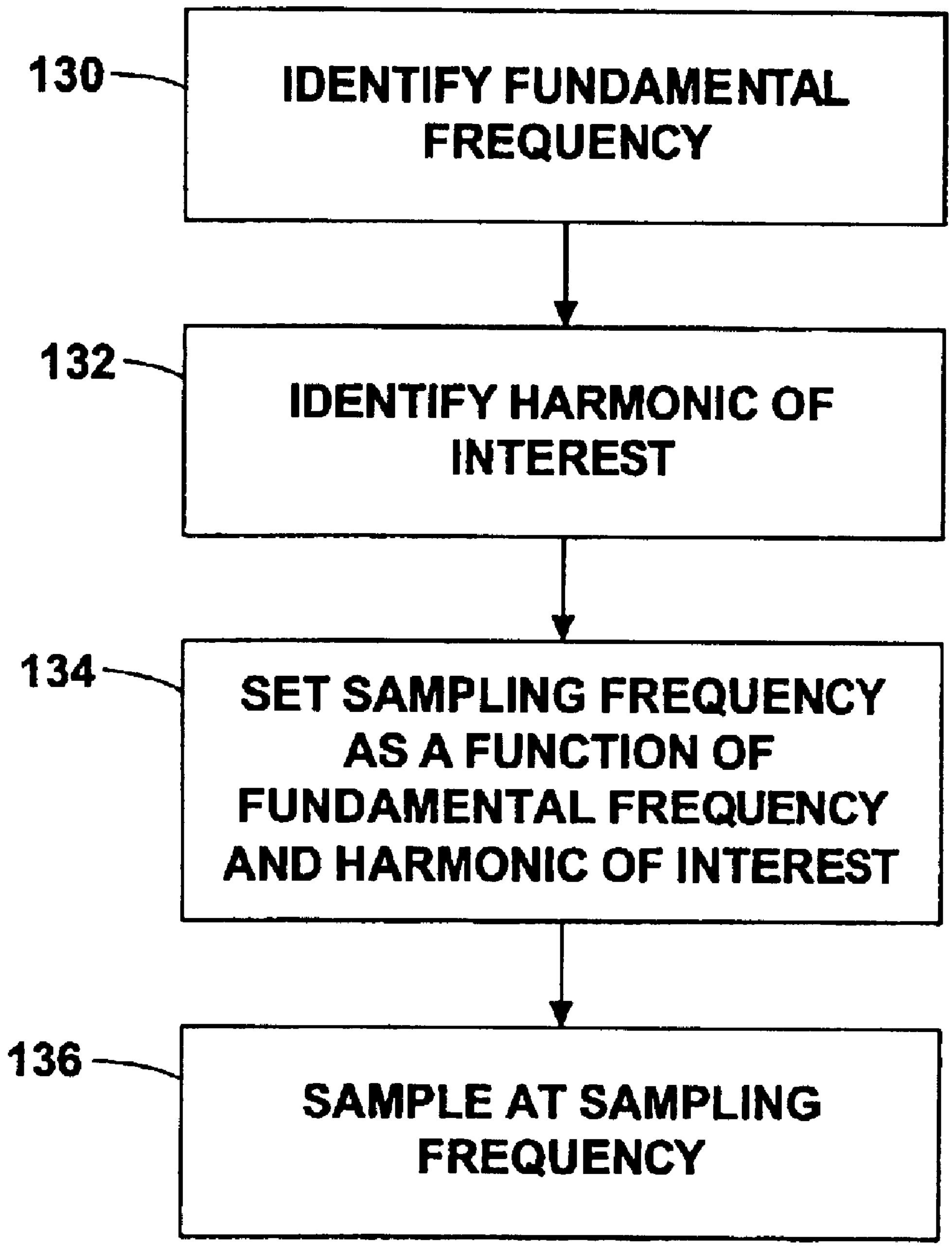
FIG. 8 is a flow diagram illustrating a technique for selecting parameters for sampling of a feedback signal.

FIG. 8 depicts a technique for setting the sampling parameters to obtain amplitude and phase data without distortion. Processor 106 selects a sampling frequency $f_s$ (or in units of radians, $\omega_s$) for as an integer multiple of a fundamental frequency. The fundamental frequency is a known process frequency, $f_p$ (or in units of radians, $\omega_p$).

In particular, processor 106 identifies a fundamental frequency (130). The fundamental frequency is an angular velocity such as the base angular velocity in equation (2). The frequency of noise due to disturbances caused by distributed physical features may occur at the frequency at which a rotating component rotates, or at a higher harmonic. The harmonic of the noise may be identified as described above (132). The sampling frequency employed by pre-processing unit 102 may then be set by processor 106 as a function of the fundamental frequency and the harmonic of interest (134) as follows:

$$f_s=f_P\cdot\frac{N}{k} \tag{11}$$

or, in units of radians, $$\omega_s=\omega_p\cdot\frac{N}{k} \tag{12}$$

The number of samples in the window, N, may also be changed. For efficient operation of a DFT, however, it may be advantageous to constrain N to particular values.

Pre-processing unit 102 may sample feedback signals at the sampling frequency (136). Selection of the sampling frequency as a function of the angular velocity may result in distortion of amplitude and phase data for signals that are not multiples of the fundamental. Because the goal is to obtain accurate amplitude and phase data for noise signals, however, distortion of other signals may be unimportant.

Harmonic k may be selected to provide accurate values of the magnitude and phase of coefficients at the kth harmonic, and some other harmonics as well. For example, selecting sampling frequency $f_s$ to obtain accurate magnitude and phase data for the ninth harmonic may obtain accurate magnitude and phase data for the third harmonic as well. In the event there are two noise frequencies of interest and the harmonic of one is not a harmonic of the other, then a harmonic could be selected that is the least common multiple of the two harmonics in interest, or the techniques shown in FIG. 8 could be repeated for each harmonic separately.

With the sampling frequency set as described above, the DFT operation shown in equation (10) yields a coefficient representing the magnitude and phase of the noise accurately. When there is one noise signal at a single harmonic or a few noise signals at a few harmonics, performing a DFT operation for those harmonics may be more computationally efficient than performing an FFT. When there are several noise signals at several harmonics, however, an FFT may be more efficient. In either case, the coefficients representing the magnitude and phase of the noise may be used to finely tune the digital notch filter to suppress the noise. For example, damping ratio ζ may be selected to generate a narrow notch for improved filtering.

The invention may present a number of advantages. The adaptive notch filter is well-suited for rejecting noise due to physical features in the system, and is especially helpful in rejecting some kinds of noise due to spatial disturbances that are not indicative of component performance. As the center frequency of the noise changes with angular velocity, the frequency band rejected by a notch filter changes with the angular velocity as well. The notch continues to reject the noise. In addition, the noise is rejected without regard to the phase of the noise.

With the adaptive notch filter, the controller can be made very responsive to the feedback signals. Because noise created by spatially distributed physical features is attenuated by the notch filter, the controller will not respond to the noise. Accordingly, the controller can implement a high gain to respond quickly to signals reflecting actual performance, with less risk of responding to noise signals. The adaptive notch may also be faster and more efficient than many other techniques for noise rejection, such as repeatedly performing an FFT on one or more feedback signals to identify unwanted frequency components. The notch filter described above is faster and less computationally intense than performing FFT operations.

A number of embodiments of the invention have been described. Nevertheless, various modifications can be made without departing from the scope of the invention. For example, several rotating components having angular velocities have been identified in an exemplary system such as system 10 shown in FIG. 1. Rotating components may include roller 14, roller 14 and shafts 20, 26 and 38. Other components in a system may also rotate, and controller 12 may adapt the center frequency attenuated by a notch filter as a function of the angular velocity of another rotating component.

In addition, damping ratio ζ, which determines the width and attenuation of the notch, need not be constant. In embodiments including multiple notch filters, ζ may differ from filter to filter. In addition, the ζ of a single filter may be adjusted to provide good attenuation of noise.

Further, the transfer function shown in equation (1) is the transfer function for a second-order notch filter, but the invention is not limited to second-order filters. Different transfer functions for notch filters may also be used.

The invention may be embodied as a medium that stores one or more instructions to cause a digital processor to implement the techniques described above. Such storage medium may include, for example, NVRAM, FLASH memory, or magnetic or optical storage media. The storage medium may be internal or external to the digital processor. These and other embodiments are within the scope of the following claims.

What is claimed is:

1. A method comprising:

receiving a speed signal representing an angular velocity of a rotating component;

receiving a feedback signal from a sensor coupled to the rotating component;

identifying in the feedback signal at least one frequency of a periodic noise signal that changes linearly with a change in the angular velocity of the rotating component, wherein the periodic noise signal represents periodic errors introduced by imperfections of the sensor; and attenuating the identified frequency of the feedback signal from the sensor as a function of the angular velocity to remove the periodic errors introduced by the sensor.

2. The method of claim 1, wherein attenuating a frequency band comprises controlling the center frequency of a notch filter based on the identified frequency of the periodic noise signal.

3. The method of claim 2, wherein controlling the center frequency comprises dynamically adjusting the notch frequency as a function of a change of the angular velocity.

4. The method of claim 1, wherein the speed signal comprises a reference signal that represents a target angular velocity.

5. The method of claim 1, further comprising, following attenuation of the frequency band, outputting a control signal to control a motor as a function of the feedback signal.

6. The method of claim 1, further comprising selecting a sampling frequency as a function of the angular velocity.

7. The method of claim 1, wherein the speed signal comprises a signal as a function of at least one of a rotational position, an angular velocity or an angular acceleration of the a rotating component.

8. A medium comprising one or more instructions to cause a processor to:

receive a speed signal representing an angular velocity of a rotating component;

receiving a feedback signal from a sensor coupled to the rotating component;

identify in the feedback signal at least one frequency of a periodic noise signal that changes linearly with a change in the angular velocity of the rotating component, wherein the feedback signal includes periodic errors introduced by the sensor; and attenuate the identified frequency of the feedback signal from the sensor as a function of the angular velocity to remove the periodic errors.

9. The medium of claim 8, wherein attenuating a frequency band comprises controlling the center frequency of a notch filter.

10. The medium of claim 9, wherein controlling the center frequency comprises dynamically adjusting the notch frequency as a function of a change of the angular velocity.

11. The medium of claim 8, wherein the speed signal is a reference signal that represents a target angular velocity.

12. The medium of claim 8, the instructions further causing the processor, following attenuation of the frequency band, to output a control signal to control a motor as a function of the feedback signal.

13. The medium of claim 8, the instructions further causing the processor to select a sampling frequency as a function of the angular velocity.

14. The medium of claim 8, wherein the speed signal comprises a signal as a function of at least one of a rotational position, an angular velocity or an angular acceleration of the rotating component.

15. A system comprising:

a motor operable to drive a rotating component in response to a motor control signal;

a sensor to generate a feedback signal representing a measurement of the rotating component; and a filter that receives the feedback signal and attenuates a frequency band of the feedback signal as a function of an angular velocity of the rotating component based on an identified frequency of a periodic noise signal within the feedback signal that changes linearly with a change in the angular velocity of the rotating component.

16. The system of claim 15, wherein the measurement comprises at least one of the position or the angular velocity of the rotating component.

17. The system of claim 15, wherein the angular velocity composes a target angular velocity for the rotating component provided by a reference signal.

18. The system of claim 15, further comprising a controller to generate the motor control signal as a function of the filtered feedback signal.

19. The system of claim 15, further comprising a roller coupled to the motor.

20. The system of claim 19, wherein the sensor is mounted to a shaft of the roller.

21. The system of claim 15, wherein the sensor is mounted to a shaft of the motor.

22. The system of claim 15, wherein the sensor outputs a position-encoded speed signal.

23. The system of claim 15, further comprising a digital processor to control the filter.

24. The system of claim 15, further comprising a processor to sample the feedback signal.

25. The system of claim 24, wherein the processor controls a sampling rate as a function of the angular velocity.

26. A method comprising:

rotating a component at an angular velocity;

changing the angular velocity; and identifying in a feedback signal responsive to the rotation at least one frequency of a periodic signal that changes linearly with the change in angular velocity.

27. The method of claim 26, further comprising calculating a scaling factor as a function of the angular velocity and the frequency of the periodic signal.

28. The method of claim 26, further comprising:

changing the gain of a controller; and identifying in the feedback signal at least one frequency of periodic noise that changes linearly with the change in angular velocity.

29. The method of claim 26, further comprising:

selecting a notch filter having a center frequency approximately equal to the frequency of the periodic signal; and filtering the feedback signal with the notch filter.

30. The method of claim 29, further comprising changing the center frequency of the notch fitter linearly with the change in angular velocity.

31. A method comprising:

receiving a feedback signal generated by a sensor coupled to a rotating component;

identifying in the feedback signal at least one frequency band of noise generated by one or more spatially distributed physical features on at least one rotating component having an angular velocity, wherein the frequency band changes linearly with a change in the angular velocity of the rotating component;

computing a center frequency for a notch filter as a function of the angular velocity and the identified frequency band of the noise; and applying the notch filter to the feedback signal to attenuate the frequency baud of noise.

32. The method of claim 31, further comprising computing a scaling factor that relates the identified frequency band to the angular velocity.

33. The method of claim 31, further comprising attenuating the frequency band of noise with the notch filter.

34. An apparatus comprising:

a pre-processing unit that receives and samples a feedback signal provided by a sensor coupled to a rotating component; and a processor that receives a reference signal indicating a target angular velocity for the rotating component and filters the sampled feedback signal with a notch filter, wherein the processor sets a center frequency of the notch filter as a fiction of the target angular velocity and a periodic noise signal within the feedback signal that changes linearly with a change in the angular velocity of the rotating component.

35. The apparatus of claim 34, further comprising a current driver, wherein the processor drives the current driver as a function of the target angular velocity and the filtered feedback signal.

36. The apparatus of claim 34, wherein the processor generates a set of data elements that relate the target angular velocity and the filtered feedback signal.

37. A method comprising:

receiving a feedback signal representing an angular velocity of a rotating component;

identifying a fundamental frequency as a function of an angular velocity of the rotating component;

identifying a harmonic of the fundamental frequency;

setting a sampling frequency for sampling a feedback signal produced by a sensor coupled to the rotating component as a function of the fundamental frequency and the harmonic;

sampling the feedback signal in accordance with the selected sampling frequency to generate a sampled feedback signal;

setting a center frequency of a digital notch filter as a function of the angular velocity of the rotating component and a noise signal within the feedback signal that changes linearly with a change in the angular velocity of the rotating component;

applying the digital notch filter to attenuate a frequency band of the sampled feedback signal to attenuate periodic noise within the feedback signal; and outputting a control signal to control the rotating component based on the attenuated feedback signal.

38. The method of claim 37, further comprising:

computing the magnitude and phase of a noise signal having a frequency of the harmonic of the fundamental frequency; and dynamically adjusting a damping ratio of the digital notch filter as a function of the computed magnitude and phase of the selected harmonic.

39. The method of claim 38, further comprising controlling a parameter of a notch filter as a function of the magnitude mud phase of the noise signal.

40. The method of claim 37, further comprising computing the coefficient of the discrete Fourier Transform of the feedback signal at the harmonic.

* * * * *

UNITED STATES PATENT AND TRADEMARK OFFICE

CERTIFICATE OF CORRECTION

PATENT NO. : 6,963,184 B2

DATED : November 8, 2005

INVENTOR(S) : Carlson, Daniel H.

It is certified that error appears in the above-identified patent and that said Letters Patent is hereby corrected as shown below:

Column 16,
Line 31, delete "composes" and insert -- comprises --.

Column 17,
Line 2, delete "fitter" and insert -- filter --.
Line 19, delete "baud" and insert -- band --.
Line 33, delete "fiction" and insert -- function --.

Column 18,
Line 38, delete "mud" and insert -- and --.

Signed and Sealed this

Second Day of May, 2006

JON W. DUDAS

*Director of the United States Patent and Trademark Office*